(12) United States Patent
Chuang et al.

(10) Patent No.: US 8,242,834 B2
(45) Date of Patent: Aug. 14, 2012

(54) CHARGE PUMP CIRCUIT

(75) Inventors: Chen-Jung Chuang, Hsinchu (TW);
Shih-Pin Hsu, Tainan (TW);
Cheng-Chung Huang, Hsinchu (TW);
Wen-Ping Chou, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 128 days.

(21) Appl. No.: 12/766,911

(22) Filed: Apr. 25, 2010

(65) Prior Publication Data

US 2011/0012671 A1 Jan. 20, 2011

(30) Foreign Application Priority Data

Jul. 14, 2009 (TW) ................................ 98123712 A (51) Int. Cl.
*G05F 1/10* (2006.01)
*G05F 3/02* (2006.01)
(52) U.S. Cl. ...................................................... 327/536

(58) Field of Classification Search .................. 327/536; 363/59–60; 307/109–110
See application file for complete search history.

(56) References Cited

U.S. PATENT DOCUMENTS

| | | | |
|---|---|---|---|
| 2009/0039947 A1* | 2/2009 | Williams | 327/536 |
| 2009/0066407 A1* | 3/2009 | Bowman et al. | 327/536 |
| 2009/0174466 A1* | 7/2009 | Hsieh et al. | 327/536 |

* cited by examiner

*Primary Examiner* — Quan Tra
(74) *Attorney, Agent, or Firm* — Winston Hsu; Scott Margo (57) ABSTRACT

A charge pump circuit includes an input end, a first reservoir capacitor, a second reservoir capacitor, a first output end, a second output end, and a charge pump unit. The input end is utilized for receiving an input voltage. The charge pump unit includes a first flying capacitor, a second capacitor, a plurality of switches, and a control unit. The control unit is utilized for controlling on/off state of the plurality of switches so that the first flying capacitor provides a positive charge pump voltage to the first output end or a negative charge pump voltage to the second output and the second flying capacitor provides a positive charge pump voltage to the first output end through charge and discharge process.

9 Claims, 12 Drawing Sheets

CHARGE PUMP CIRCUIT

BACKGROUND OF THE INVENTION

1. Field of the Invention

The present invention relates to a charge pump circuit, and more particularly, to a charge pump circuit capable of high efficiency operation via arrangement of a charge distribution ratio.

2. Description of the Prior Art

Charge pump circuits are typically applied in driving circuits of electronic products, such as memory drivers, LCD backlight modules, and LED backlight drivers. The charge pump circuit accomplishes energy transfer and voltage conversion by using charges stored on capacitors to establish required positive or negative high output voltages, and also simultaneously provides different output voltages at various voltage levels.

Figure 1:
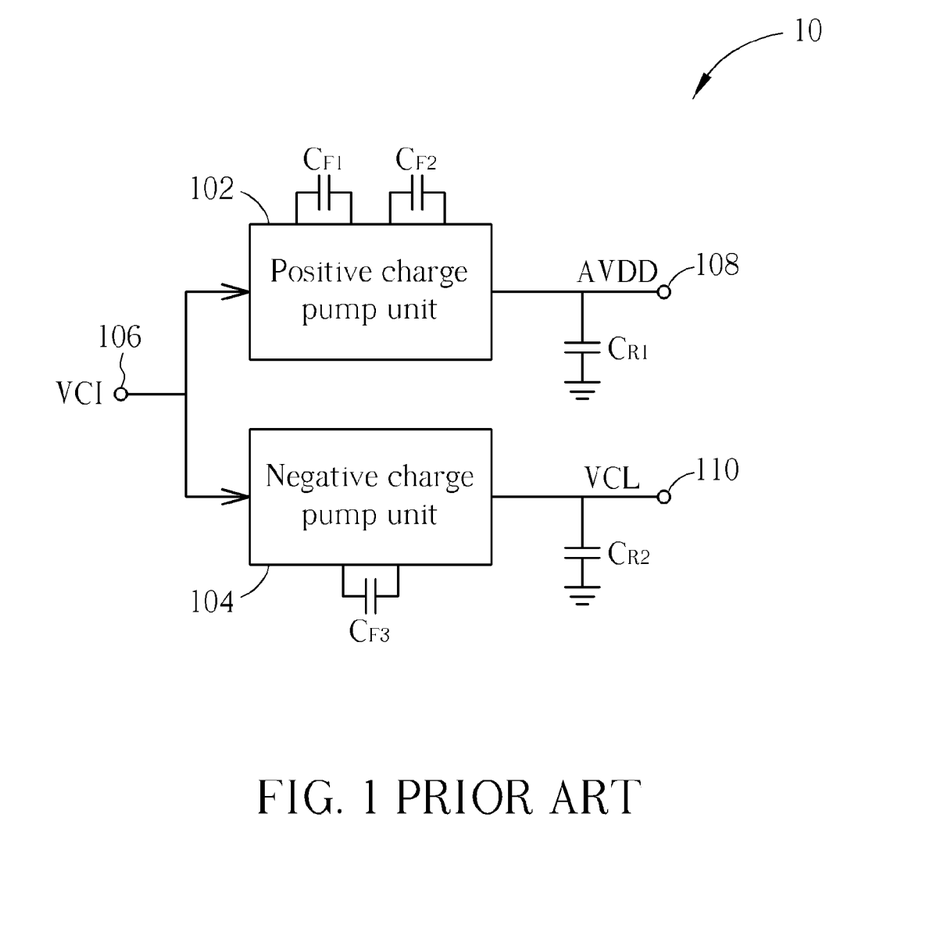
FIG. 1 is a schematic diagram of a charge pump circuit according to the prior art.

Please refer to FIG. 1. FIG. 1 is a schematic diagram of a charge pump circuit 10 according to the prior art. As shown in FIG. 1, the charge pump circuit 10 includes a positive charge pump unit 102, a negative charge pump unit 104, a second stage charge pump unit 106, and a diode 108. The positive charge pump unit 102 is used for converting an input voltage VCI to a positive charge pump voltage AVDD, which is usually a multiple of the input voltage VCI. The negative charge pump unit 104 is used for converting the input voltage VCI to a negative charge pump voltage VCL which is a negative voltage and usually a negative multiple of the input voltage VCI. As shown in FIG. 1, the positive charge pump unit 102 utilizes two flying capacitors $C_{F1}$ and $C_{F2}$ and the negative charge pump unit 104 utilizes one flying capacitor $C_{F3}$ for energy storage and transfer.

Figure 2:
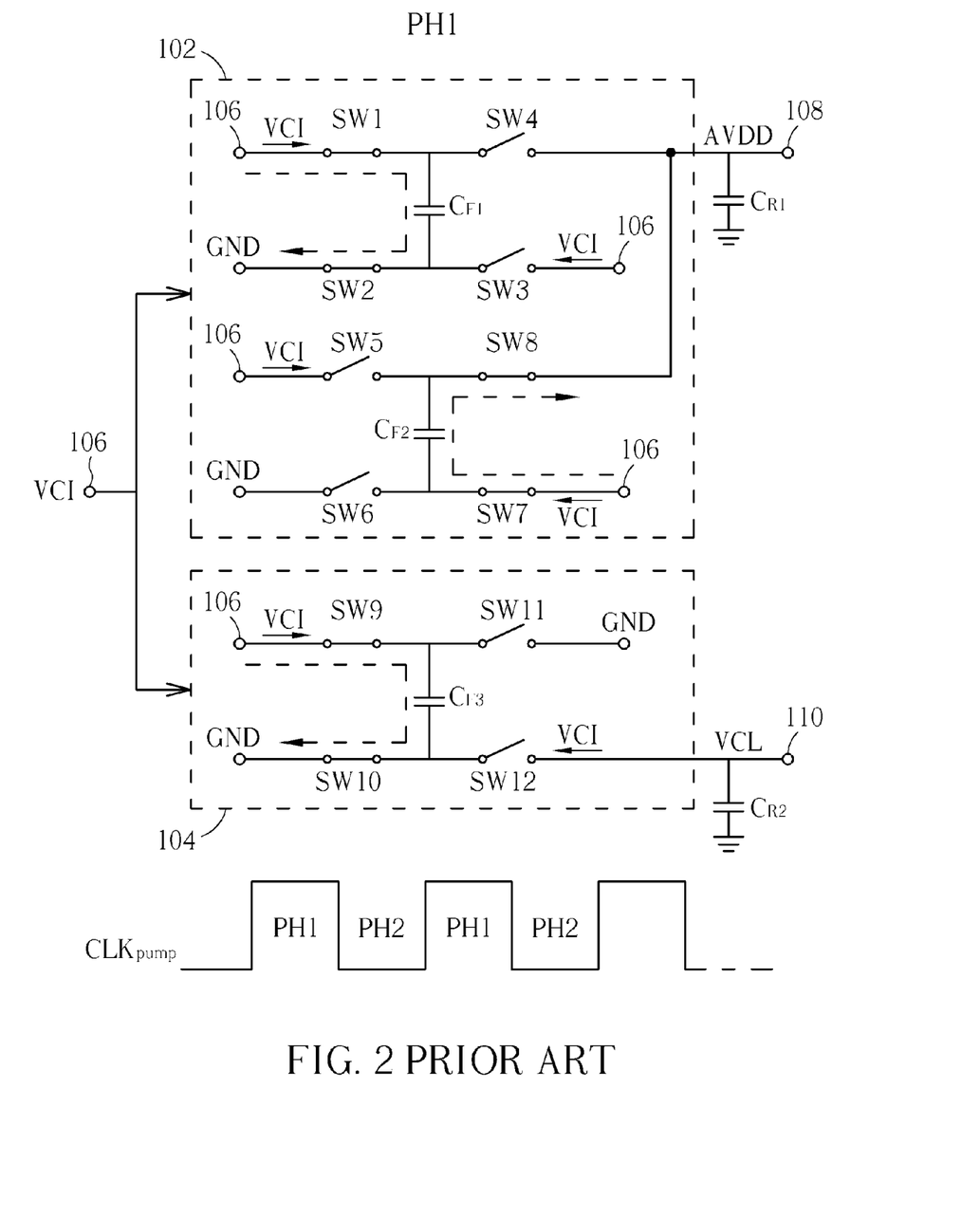
FIG. 2 is schematic diagrams of the charge pump circuit shown in FIG. 1 operating in first operation phase PH1.
Figure 3:
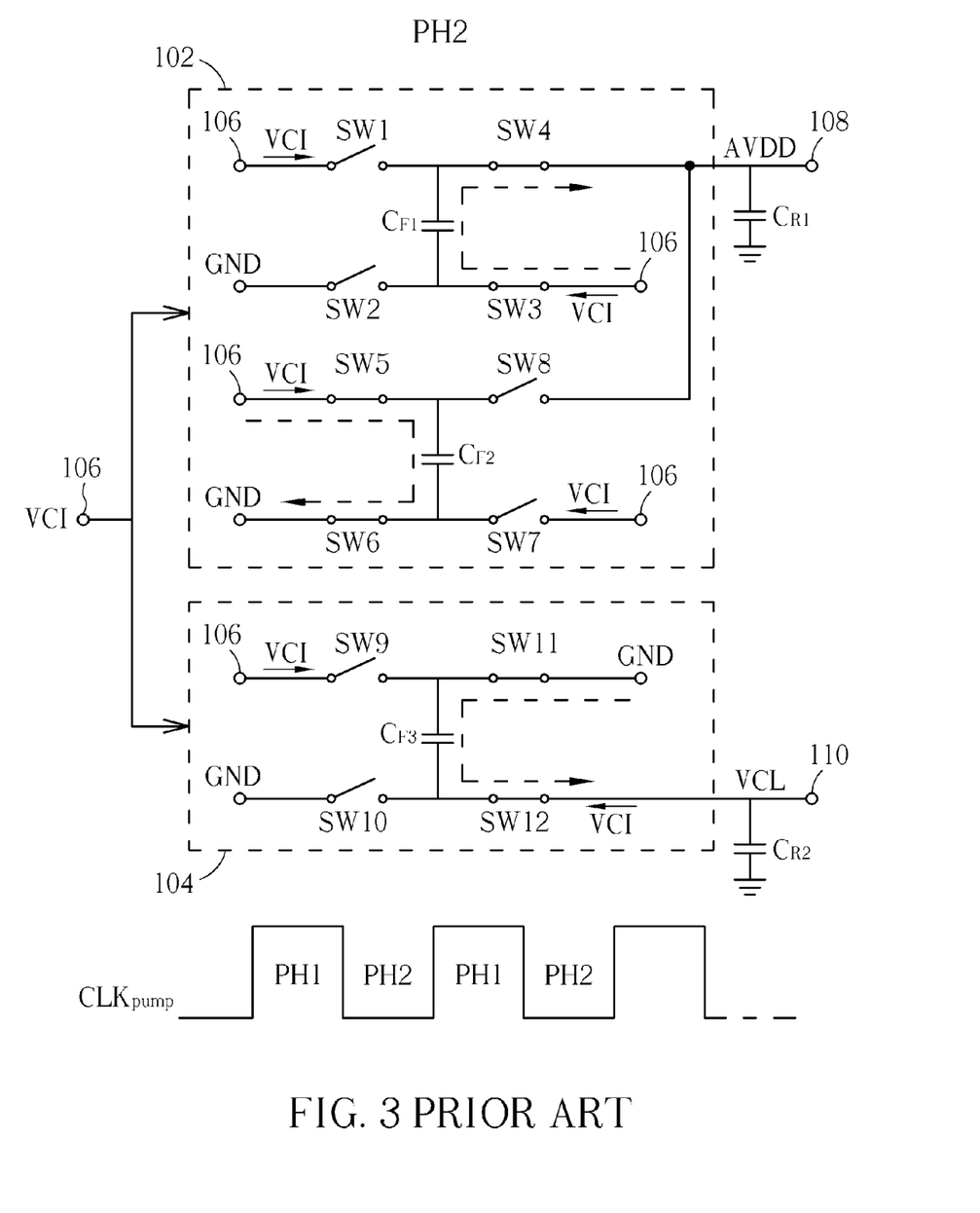
FIG. 3 is schematic diagrams of the charge pump circuit shown in FIG. 1 operating in second operation phase PH2.

The conventional charge pump circuit 10 usually employs two-phase operation, including a first operation phase PH1 and second operation phase PH2, for the positive charge pump unit 102 and the negative charge pump unit 104. Please refer to FIG. 2 and FIG. 3. FIG. 2 and FIG. 3 are schematic diagrams of the charge pump circuit 10 shown in FIG. 1 operating in the first operation phase PH1 and the second operation phase PH2, respectively. The positive charge pump unit 102 includes flying capacitors $C_{F1}$ and $C_{F2}$, a reservoir capacitor $C_{R1}$, and switches SW1 to SW8. The negative charge pump unit 104 includes a flying capacitor $C_{F3}$, a reservoir capacitor $C_{R2}$, and switches SW9 to SW12. Interconnections of the switches SW1 to SW12 are as shown in FIG. 2 and FIG. 3, and further description thereof is omitted for brevity. Please further refer to FIG. 2. During the first operation phase PH1, the switches SW1, SW2, and SW7 to SW10 are on, and the remaining switches SW3 to SW6, and SW11 to SW12 are off. In such a condition, the input voltage VCI charges the flying capacitor $C_{F1}$ to cause the voltage across the flying capacitor $C_{F1}$ to be the same as the input voltage VCI. The flying capacitor $C_{F2}$ charges the reservoir capacitor $C_{R2}$ to cause the voltage across the reservoir capacitor $C_{R1}$ to be twice the input voltage VCI, such that the positive charge pump voltage AVDD is then outputted at two times the input voltage VCI. The input voltage VCI also charges the flying capacitor $C_{F3}$.

Please further refer to FIG. 3. While operating in the second operation phase PH2, the switches SW3, SW4, SW5, SW6, SW11, and SW12 are on; the switches SW1, SW2, and SW7 to SW10 are off. In such a condition, the flying capacitor $C_{F1}$ charges the reservoir capacitor $C_{R1}$ to cause the voltage across the reservoir capacitor $C_{R1}$ to be twice the input voltage VCI. The flying capacitor $C_{F3}$ charges the reservoir capacitor $C_{R2}$ to cause the voltage across the reservoir capacitor $C_{R2}$ to be the negative input voltage VCI. The input voltage VCI charges the flying capacitor $C_{F2}$ to cause the voltage across the flying capacitor $C_{F2}$ to be the same as the input voltage VCI. Therefore, the charge pump circuit 10 can realize required multiplied positive or negative voltages by operating in the mentioned two operation phases PH1, PH2 in turn according to a charge pump clock CLK_Pump.

However, in practice, the positive charge pump unit 102 needs to achieve high pumping efficiency so that the prior art needs to utilize more flying capacitors for energy storage and transfer in addition to increased operation clock or enlarged size of semiconductor elements. For example, the positive charge pump unit 102 utilizes two flying capacitors ($C_{F1}$, $C_{F2}$), and the negative charge pump unit 104 also utilizes one flying capacitor ($C_{F3}$). Therefore, this may waste manufacturing cost.

SUMMARY OF THE INVENTION

It is therefore an objective of the present invention to provide a charge pump circuit with charge proportional distribution capability.

The present invention discloses a charge pump circuit for producing a positive charge pump voltage and a negative charge pump voltage according to an input voltage, which the charge pump circuit comprises an input end for receiving the input voltage; a first reservoir capacitor comprising a first terminal and a second terminal, wherein the second terminal is coupled to a ground end; a second reservoir capacitor comprising a first terminal and a second terminal, wherein the second terminal is coupled to the ground end; a first output end coupled to the first terminal of the first reservoir capacitor for outputting the positive charge pump voltage; a second output end coupled to the first terminal of the second reservoir capacitor for outputting the negative charge pump voltage; and a charge pump unit coupled to the input end, the first terminal of the first reservoir capacitor, and the first terminal of the second reservoir capacitor, the charge pump unit comprises a first flying capacitor; a second flying capacitor; a first switch coupled between the input end and a first terminal of the first flying capacitor; a second switch coupled between the ground end and a second terminal of the first flying capacitor; a third switch coupled between the input end and the second terminal of the first flying capacitor; a fourth switch coupled between the first terminal of the first reservoir capacitor and the first terminal of the first flying capacitor; a fifth switch coupled between the ground end and the first terminal of the first flying capacitor; a sixth switch coupled between the first terminal of the second reservoir capacitor and the second terminal of the first flying capacitor; a seventh switch coupled between the input end and a first terminal of the second flying capacitor; an eighth switch coupled between the ground end and a second terminal of the second flying capacitor; an ninth switch coupled between the input end and the second terminal of the second flying capacitor; an tenth switch coupled between the first terminal of the first reservoir capacitor and the first terminal of the second flying capacitor; and a control unit for controlling on/off operation of the first switch, the second switch, the third switch, the fourth switch, the fifth switch, the sixth switch, the seventh switch, the eighth switch, the ninth switch, and the tenth switch to produce the positive charge pump voltage and the positive charge pump voltage.

The present invention discloses a charge pump circuit for producing a positive charge pump voltage and a negative charge pump voltage according to an input voltage, which comprises an input end for receiving the input voltage; a first reservoir capacitor comprising a first terminal and a second terminal, wherein the second terminal is coupled to a ground end; a second reservoir capacitor comprising a first terminal and a second terminal, wherein the second terminal is coupled to the ground end; a first output end coupled to the first terminal of the first reservoir capacitor for outputting the positive charge pump voltage; a second output end coupled to the first terminal of the second reservoir capacitor for outputting the negative charge pump voltage; and a charge pump unit coupled to the input end, the first terminal of the first reservoir capacitor, and the first terminal of the second reservoir capacitor, which the charge pump unit comprises a first flying capacitor; a second flying capacitor; a first switch coupled between the input end and a first terminal of the first flying capacitor; a second switch coupled between the ground end and a second terminal of the first flying capacitor; a third switch coupled between the input end and the second terminal of the first flying capacitor; a fourth switch coupled between the first terminal of the first reservoir capacitor and the first terminal of the first flying capacitor; a fifth switch coupled between the ground end and the first terminal of the first flying capacitor; a sixth switch coupled between the first terminal of the second reservoir capacitor and the second terminal of the first flying capacitor; and a control unit for controlling on/off operation of the first switch, the second switch, the third switch, the fourth switch, the fifth switch, the sixth switch to produce the positive charge pump voltage and the positive charge pump voltage.

The present invention discloses a charge pump circuit for producing a positive charge pump voltage and a negative charge pump voltage according to an input voltage, which comprises an input end for receiving the input voltage; a first reservoir capacitor; a second reservoir capacitor; a first output end coupled to the first reservoir capacitor for outputting the positive charge pump voltage; a second output end coupled to the second reservoir capacitor for outputting the negative charge pump voltage; and a charge pump unit coupled to the input end, the first reservoir capacitor, and the second reservoir capacitor, the charge pump unit comprises a first flying capacitor; a first switching module coupled to the input end, a ground end, and the first flying capacitor; a second switching module coupled to the input end, the ground end, the first flying capacitor, and the first output end; a third switching module coupled to the input end, the ground end, the first flying capacitor, and the second output end; and a control unit for controlling on/off operation of the first switching module, the second switching module, and the third switching module to utilize the first switching module to charge the first flying capacitor and to selectively utilize the second switching module and the third switching module to transfer the charges stored on the first flying capacitor to the first reservoir capacitor or the second reservoir capacitor so as to output the positive charge pump voltage via the first output end or and the positive charge pump voltage via the second output end.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
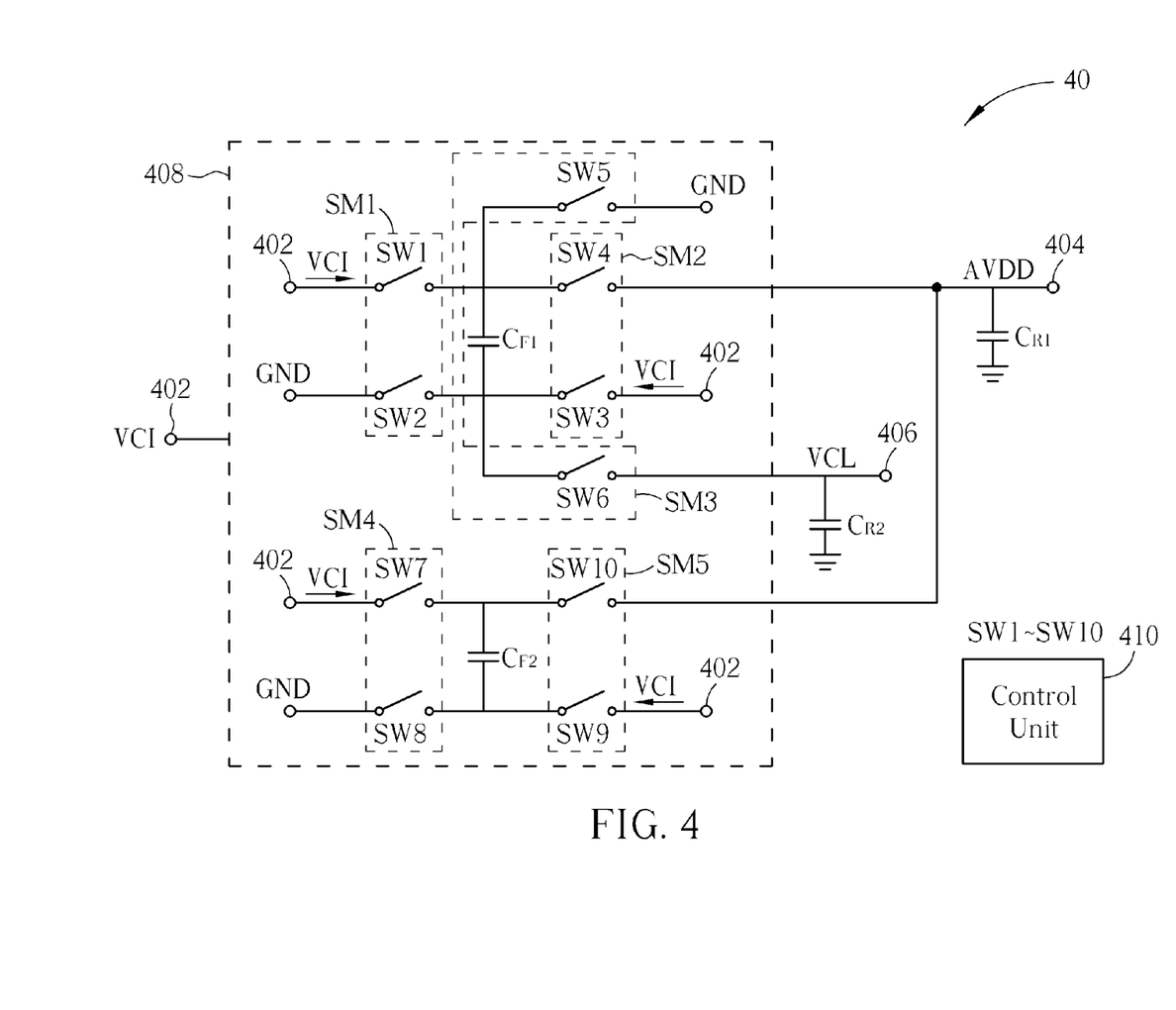
FIG. 4 is a schematic diagram of a charge pump circuit according to an embodiment of the present invention.

Please refer to FIG. 4. FIG. 4 is a schematic diagram of a charge pump circuit 40 according to an embodiment of the present invention. The charge pump circuit 40 receives an input voltage VCI via an input end 402, and performs voltage conversion with the input voltage VCI. The charge pump circuit 40 can provide a positive charge pump voltage AVDD which is higher than the input voltage VCI, and a negative charge pump voltage VCL. The positive charge pump voltage AVDD and the negative charge pump voltage VCL are outputted from a first output end 404 and a second output end 406, respectively. The charge pump circuit 40 includes a charge pump unit 408, a control unit 410, a first reservoir capacitor $C_{R1}$, and a second reservoir capacitor $C_{R2}$. The charge pump unit 408 includes switching modules SM1 to SM5, a first flying capacitor $C_{F1}$, and a second flying capacitor $C_{F2}$. The first switching module SM1 is coupled to input end 402, ground end GND, and first flying capacitor $C_{F1}$. The second switching module SM2 is coupled to input end 402, ground end GND, first flying capacitor $C_{F1}$, and first output end 404. The third switching module SM3 is coupled to input end 402, ground end GND, first flying capacitor $C_{F1}$, and second output end 406. According to the present invention, the control unit 410 is utilized for controlling on/off operation of the first switching module SM1, the second switching module SM2, and the third switching module SM3 to utilize the first switching module SM1 to charge the first flying capacitor $C_{F1}$ and to selectively utilize the second switching module SM2 and the third switching module SM3 to transfer charges stored on the first flying capacitor $C_{F1}$ to the first reservoir capacitor $C_{R1}$ or the second reservoir capacitor $C_{R2}$, such that the charge pump circuit 40 outputs the positive charge pump voltage AVDD via the first output end 404 or the negative charge pump voltage VCL via the second output end 406. In other words, compared with the conventional method, the present invention can provide positive and negative charge pump voltages by sharing the first flying capacitor $C_{F1}$ for voltage conversion purposes.

Regarding the charge pump circuit 40, please refer to FIG. 4. The charge pump circuit 40 is also able to control on/off operation of the fourth switching module SM4 and the fifth switching module SM5 by the control unit 410. Moreover, the control unit 410 controls the fourth switching module SM4 for charging the second flying capacitor $C_{F2}$. After that, the control unit 410 controls the fifth switching module SM5 for transferring the charges stored on the second flying capacitor $C_{F2}$ to the second reservoir capacitor $C_{R2}$ so that the charge pump circuit 40 can provide the positive charge pump voltage VCL via the second output end 404. As shown in FIG. 4, the first switching module SM1 includes the switches SW1 and SW2. The second switching module SM2 includes the switches SW3 and SW4. The third switching module SM3 includes the switches SW5 and SW6. The fourth switching module SM4 includes the switches SW7 and SW8. The fifth switching module SM5 includes the switches SW9 and SW10. The switch SW1 is coupled between the input end 402 and a first terminal of the first flying capacitor $C_{F1}$. The second switch SW2 is coupled between the ground end GND and a second terminal of the first flying capacitor $C_{F1}$. The third switch SW3 is coupled between the input end 402 and the second terminal of the first flying capacitor $C_{F1}$. The fourth switch SW4 is coupled between the first terminal of the first reservoir capacitor $C_{R1}$ and the first terminal of the first flying capacitor $C_{F1}$. The fifth switch SW5 is coupled between the ground end GND and the first terminal of the first flying capacitor $C_{F1}$. The sixth switch SW6 is coupled between the first terminal of the second reservoir capacitor $C_{R2}$ and the second terminal of the first flying capacitor $C_{F1}$. The seventh switch SW7 is coupled between the input end 402 and a first terminal of the second flying capacitor $C_{F2}$. The eighth switch SW8 is coupled between the ground end GND and a second terminal of the second flying capacitor $C_{F2}$. The ninth switch SW9 is coupled between the input end 402 and the second terminal of the second flying capacitor $C_{F2}$. The tenth switch SW10 is coupled between the first terminal of the first reservoir capacitor $C_{R1}$ and the first terminal of the second flying capacitor $C_{F2}$. As a result, the charge pump unit 408 utilizes the first flying capacitor $C_{F1}$ and the second flying capacitor $C_{F2}$ by performing charging (energy storage) and discharging (energy transfer) procedures to share the charges to the first reservoir capacitor $C_{R1}$ and the second reservoir capacitor $C_{R2}$ for providing positive or negative multiple voltages.

In detail, the control unit 410 is coupled to switches SW1 to SW10 and controls on/off operation of each switch to make charge pump circuit 40 operate in a first operation phase PH1, a second operation phase PH2, a third operation phase PH3, a fourth operation phase PH4, a fifth operation phase PH5, and a sixth operation phase PH6. Through operating in the operation phase configurations, the charges stored on the first flying capacitor $C_{F1}$ can be transferred to the first reservoir capacitor $C_{R1}$ or the second reservoir capacitor $C_{R2}$, and the charges stored on the second flying capacitor $C_F2$ can also be transferred to the first reservoir capacitor $C_{R1}$. In other words, the present invention is capable of controlling each switch through the control unit 410 so that the first flying capacitor $C_{F1}$ and the second flying capacitor $C_F2$ can provide the required voltage according to the corresponding operation phase sequence. Further description associated with the operation of each operation phase is provided as follows.

Figure 5:
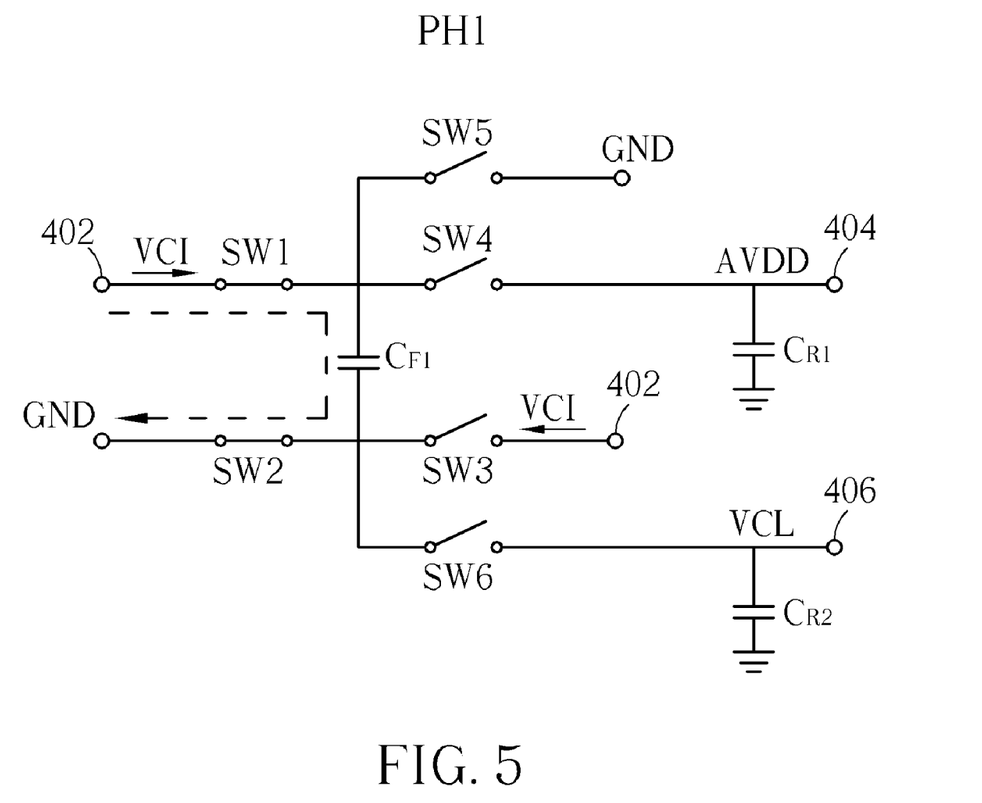
FIG. 5 to FIG. 10 are schematic diagrams of the charge pump circuit operating in each operation phases according to an embodiment of the present invention.

Please refer to FIG. 5 to FIG. 10. FIG. 5 to FIG. 10 are schematic diagrams of the charge pump circuit 40 operating in each operation phase according to an embodiment of the present invention. As shown in FIG. 5, during the first operation phase PH1, the control unit 410 controls the switches SW1 and SW2 to be turned on, and the other switches are in the off state. In such a condition, the charges corresponding to the voltage potential difference between the input voltage VCI and the ground end GND may be stored on the first flying capacitor $C_{F1}$, i.e. the input voltage VCI charges the first flying capacitor $C_{F1}$. Therefore, during the first operation phase PH1, the first flying capacitor $C_{F1}$ will be charged to a voltage identical to the input voltage VCI.

Figure 6:
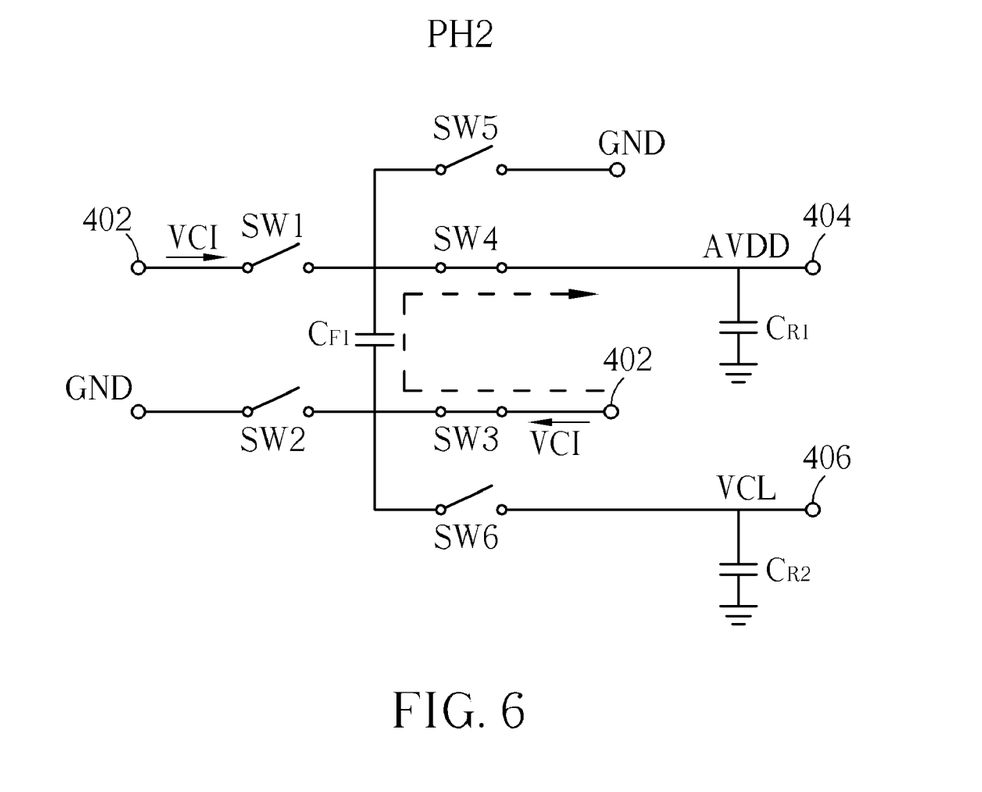
Figure 7:
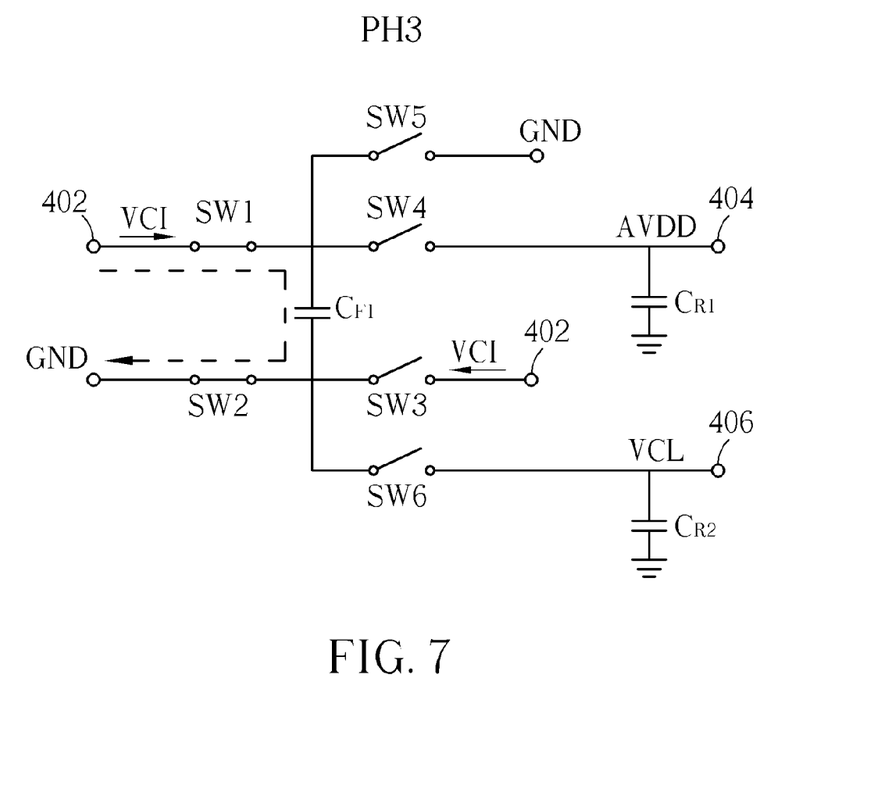
Figure 8:
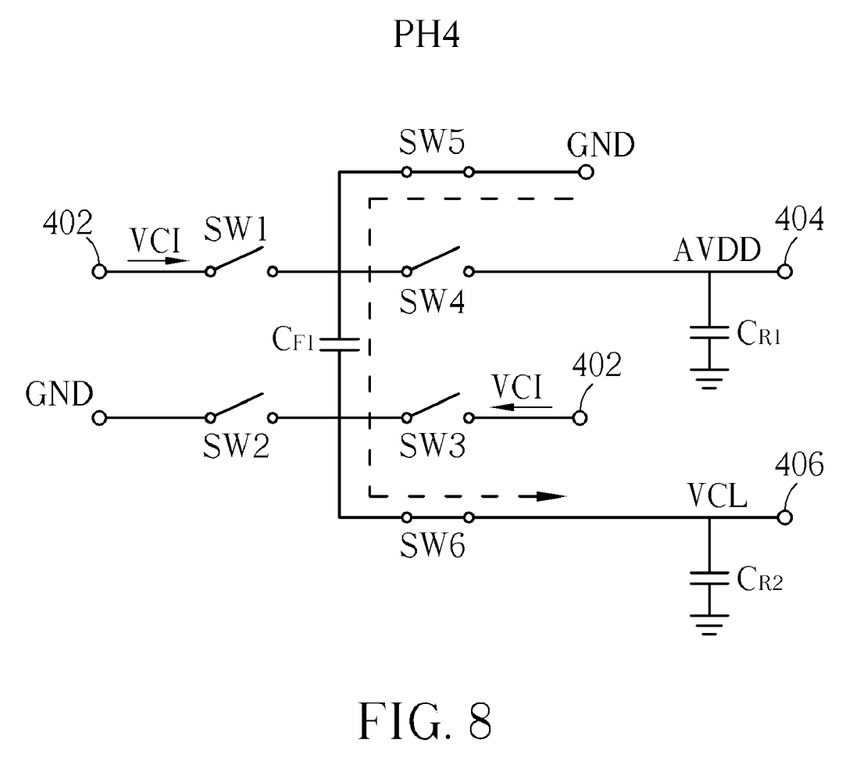

Please refer to FIG. 6. During the second operation phase PH2, the control unit 410 controls the switches SW3 and SW4 to be turned on, and the other switches are in the off state. The charges stored on the first flying capacitor $C_{F1}$ are transferred to the first reservoir capacitor $C_{R1}$, so that the first reservoir capacitor $C_{R1}$ holds a voltage difference between the first terminal and the second terminal thereof at twice the input voltage VCI after transferring. At this time, the first output end 404 can output the positive charge pump voltage AVDD at twice the input voltage VCI. Thus, after the operation of the first operation phase PH1 and the second operation phase PH2, the first flying capacitor $C_{F1}$ can store energy by charging procedure (PH1) and transfer the stored energy to the first reservoir capacitor $C_{R1}$ by discharging procedure (PH2), so as to generate the positive charge pump voltage AVDD. Please refer to FIG. 7. The third operation phase PH3 is the same as the first operation phase PH1. The control unit 410 controls the switches SW1 and SW2 to be turned on, and the other switches are in the off state. In such a condition, the input voltage VCI charges the first flying capacitor $C_{F1}$, so that the first flying capacitor $C_{F1}$ holds a voltage difference between the first terminal and the second terminal thereof identical to the input voltage after charging. Please further refer to FIG. 8. During the fourth operation phase PH4, the control unit 410 controls the switches SW5 and SW6 to be turned on, and the other switches are in the off state. The charges stored on the first flying capacitor $C_{F1}$ are transferred to the second reservoir capacitor $C_{R2}$. Because one terminal of the first flying capacitor $C_{F1}$ is coupled to the ground end GND during the fourth operation phase PH4, the voltage level of the second reservoir capacitor $C_{R2}$ compared to the ground end GND is a negative value after charging. That is, the second output end 406 outputs the negative charge pump voltage VCL at the negative input voltage VCI. As a result, through performing the operation of the first operation phase PH1 and the second operation phase PH2 for the first flying capacitor $C_{F1}$, the positive charge pump voltage AVDD can be obtained. Through performing the operation of the third operation phase PH3 and the fourth operation phase PH4 for the first flying capacitor $C_{F1}$, the negative charge pump voltage VCL can be obtained. In other words, the present invention can produce required positive or negative multiple voltages by sharing the first flying capacitor $C_{F1}$ by operation phase arrangement.

Figure 9:
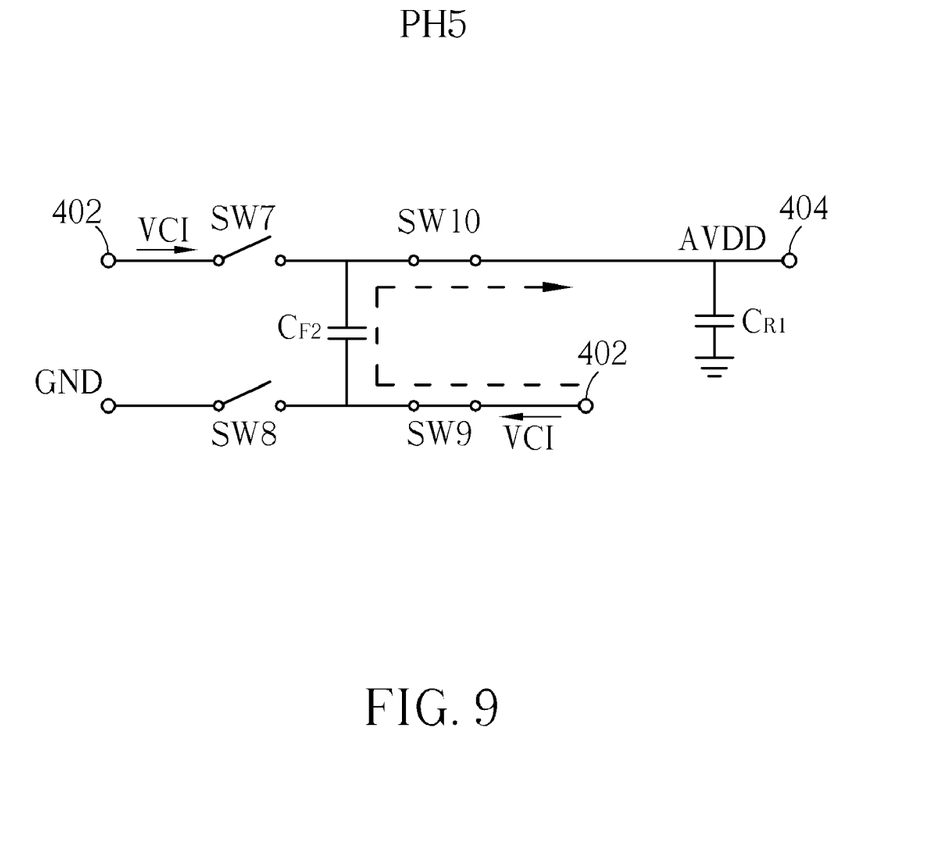
Figure 10:
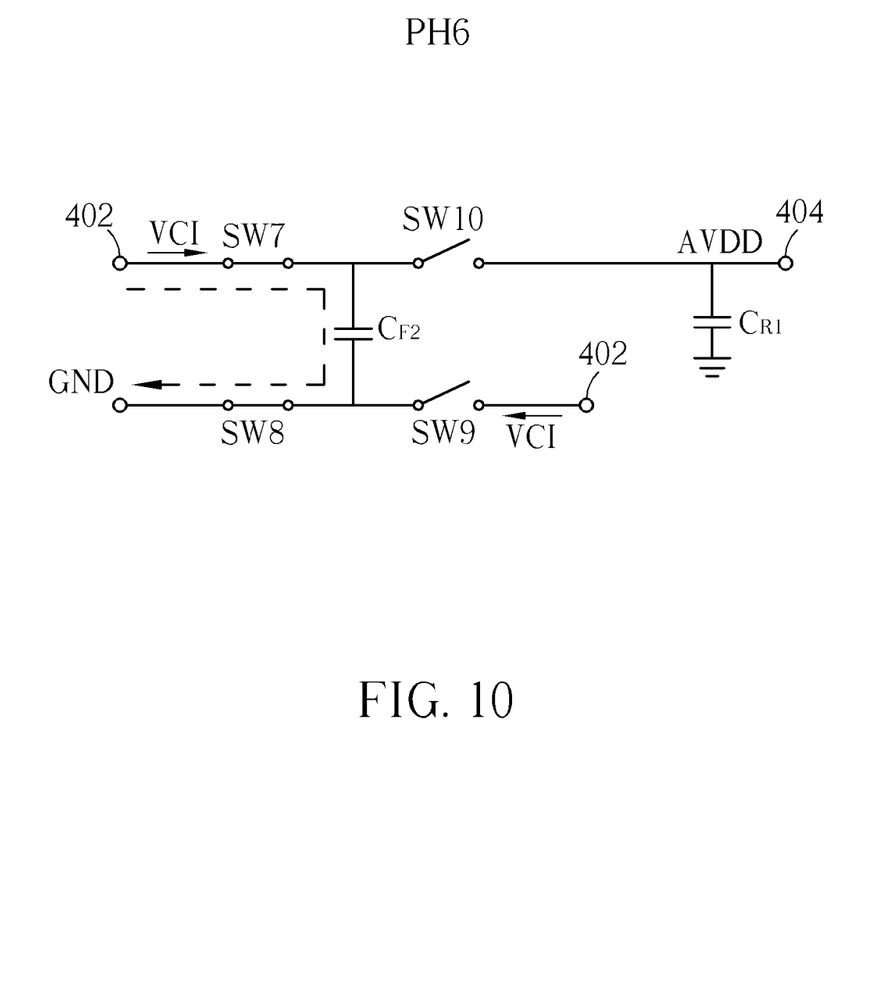

In addition, please refer to FIG. 9. During the fifth operation phase PH5, the control unit 410 controls the switches SW9 and SW10 to be turned on, and the other switches are in the off state. The charges stored on the second flying capacitor $C_{F2}$ are transferred to the first reservoir capacitor $C_{R1}$. As shown in FIG. 10, during the sixth operation phase PH6, the control unit 410 controls the switches SW7 and SW8 to be turned on, and the other switches are in the off state. In such a condition, the input voltage VCI charges the second flying capacitor $C_{F2}$, so that the second flying capacitor $C_{F2}$ holds a voltage difference between the first terminal and the second terminal thereof identical to the input voltage VCI after charging. Therefore, after the second flying capacitor $C_{F2}$ is performed in the fifth operation phase PH5 and sixth operation phase PH6, the positive charge pump voltage AVDD at twice the input voltage VCI is obtained. As can be seen, compared with the charge pump circuit 10 shown in FIG. 1 using three flying capacitors, the present invention only utilizes two flying capacitors and also achieves the same voltage conversion purpose.

In short, compared with the prior art, the present invention can dynamically arrange operation phase sequences to achieve required charge distribution proportion by sharing part of the flying capacitors for pumping purposes.

Moreover, through the operation of the first operation phase PH1, the second operation phase PH2, the operation of the third operation phase PH3 or the fourth operation phase PH4, the charges stored on the first flying capacitor $C_{F1}$ can be shared to the first reservoir capacitor $C_{R1}$ or the second reservoir capacitor $C_{R2}$ to generate the positive charge pump voltage AVDD or the negative charge pump voltage VCL.

Similarly, through the operation of the fifth operation phase PH5 and the sixth operation phase PH6, the charges stored on the second flying capacitor $C_{F2}$ can be shared to the first reservoir capacitor $C_{R1}$ to generate the positive charge pump voltage AVDD. Note that the first flying capacitor $C_{F1}$ and the second flying capacitor $C_{F2}$ are utilized for providing the positive charge pump voltage AVDD at different times. In addition, to make the first flying capacitor $C_{F1}$ provide proper charges to the first reservoir capacitor $C_{R1}$ or the second reservoir capacitor $C_{R2}$ at the right moment, the present invention can arrange sequences or times for performing the first operation phase PH1, the second operation phase PH2, the operation of the third operation phase PH3 and the fourth operation phase PH4, a result of such arrangement being called a first operation phase sequence PS1. Similarly, to make the second flying capacitor $C_{F2}$ provide proper charges to the first reservoir capacitor $C_{R1}$, the present invention can arrange sequences or times of performing the fifth operation phase PH5 and the sixth operation phase PH6, a result of such arrangement being called a second operation phase sequence PS2. In other words, through setting the first operation phase sequence PS1 and the second operation phase sequence PS2, the charge pump circuit 40 can provide the positive charge pump voltage AVDD via the first flying capacitor $C_{F1}$ and the second flying capacitor $C_{F2}$ in different operation periods, respectively, and the negative charge pump voltage VCL via the first flying capacitor $C_{F1}$. Furthermore, in the embodiment of the present invention, the first operation phase sequence PS1 and the second operation phase sequence PS2 can be generated according to a charge pump clock CLK_pump, and the length of each operation phase in the operation phase sequence is a half period of the charge pump clock CLK_pump, i.e. two operation phases are performed during each clock period.

Therefore, at the same time, the first flying capacitor $C_{F1}$ and the second flying capacitor $C_{F2}$ can perform corresponding charging or discharging procedures respectively according to the first operation phase sequence PS1 and the second operation phase sequence PS2 to generate charge pump voltages efficiently. Note that it should be considered that the first flying capacitor $C_{F1}$ and the second flying capacitor $C_{F2}$ are utilized for producing positive charge pump voltage AVDD at different times while setting the first operation phase sequence PS1 and the second operation phase sequence PS2. In other words, the first operation phase PH1 and the fifth operation phase PH5 can not be operated to generate the positive charge pump voltage AVDD at the same time. In practice, the present invention can adjust operation phases for arranging the order (charging or discharging timing) for the first flying capacitor $C_{F1}$ and the second flying capacitor $C_{F2}$ to generate the positive charge pump voltage AVDD.

Figure 11:
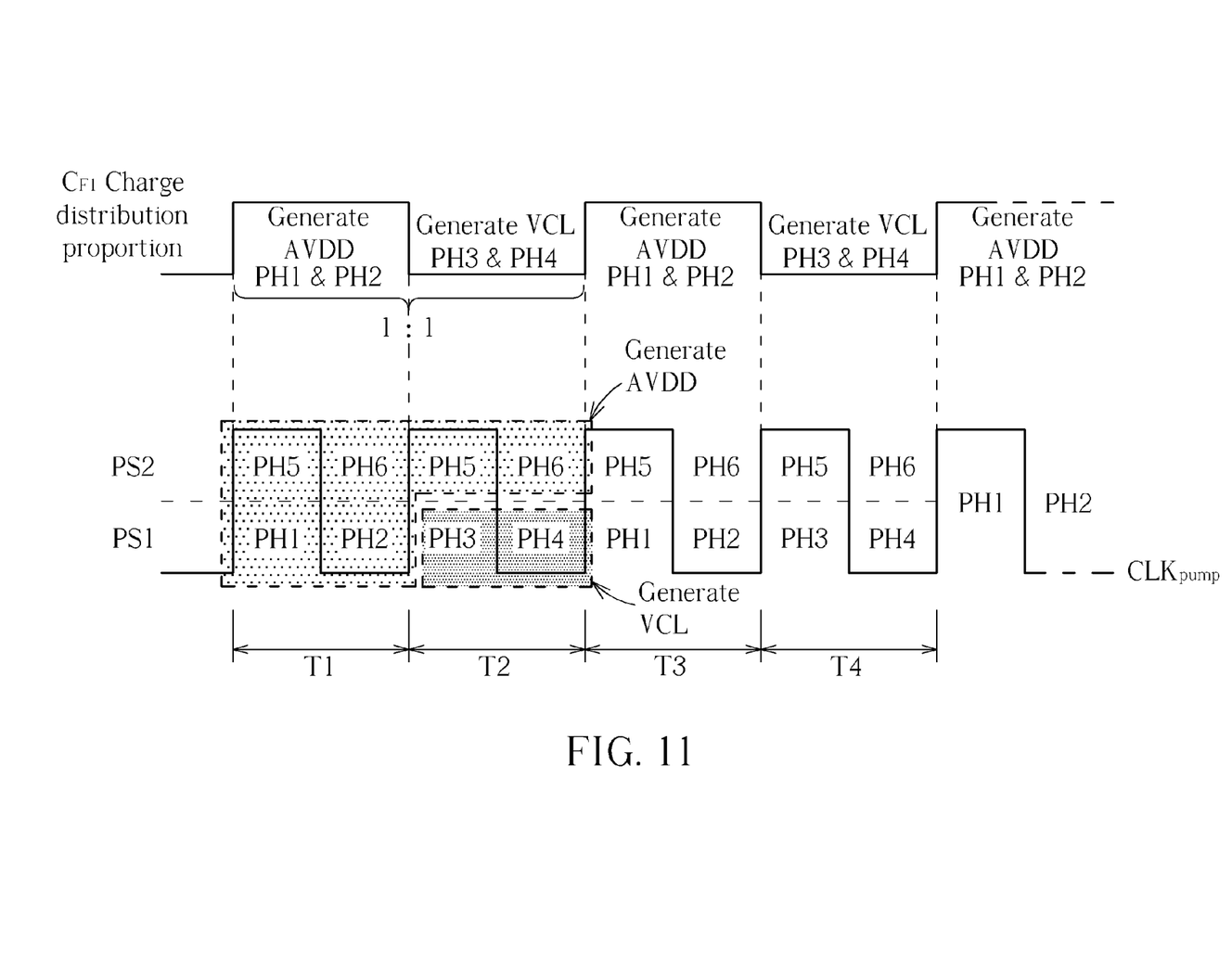
FIG. 11 is a schematic diagram of an operation phase sequence according to an embodiment of the present invention.
Figure 12:
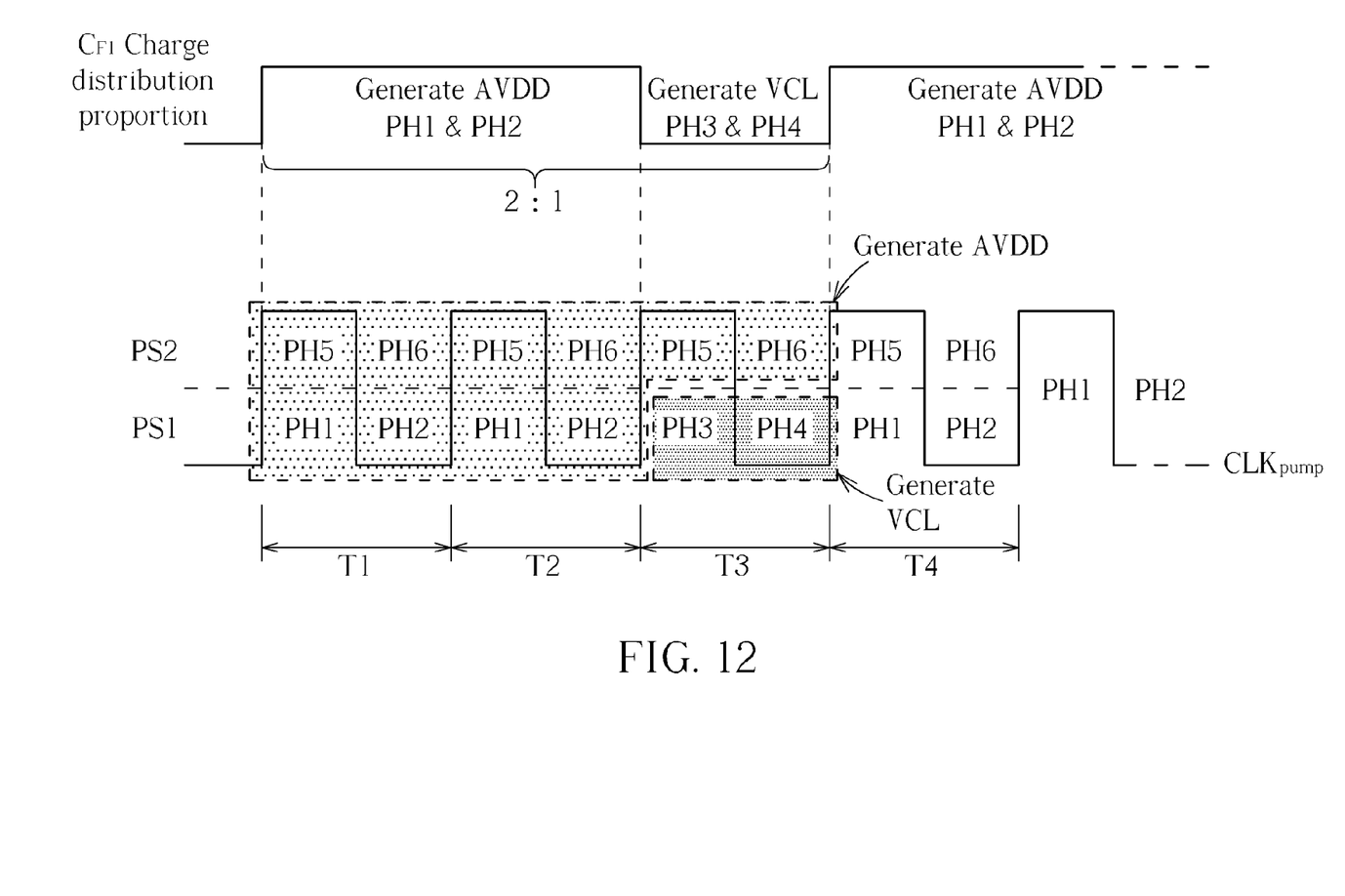
FIG. 12 is a schematic diagram of an operation phase sequence according to another embodiment of the present invention.

Briefly, according to the first operation phase sequence PS1 and the second operation phase sequence PS2, the charge pump circuit 40 can provide required voltages efficiently by sharing a flying capacitor with a proper charge distribution proportion. For example, please refer to FIG. 11. FIG. 11 is a schematic diagram of an operation phase sequence according to an embodiment of the present invention. The first operation phase sequence PS1 is [PH1 PH2 PH3 PH4] and the second operation phase sequence PS2 is [PH5 PH6]. As shown in FIG. 11, during the duty cycle T1, the positive charge pump voltage AVDD is generated, and during the duty cycle T2, the negative charge pump voltage VCL is generated. This means the half duration of each duty cycle is utilized for generating the positive charge pump voltage AVDD and the other half duty cycle of each period is utilized for generating the negative charge pump voltage VCL, so that the charge distribution proportion is: 1:1. In view of flying capacitors, the first flying capacitor $CF_1$ averages the operation time to produce the positive charge pump voltage AVDD and the negative charge pump voltage VCL. The second flying capacitor $CF_2$ only produces the positive charge pump voltage AVDD. Overall, the charge pump circuit 40 utilizes one half flying capacitor for producing the positive charge pump voltage AVDD and one half flying capacitor for producing the negative charge pump voltage VCL according to the first operation phase sequence PS1 and the second operation phase sequence PS2 in the embodiment of the present invention. Please refer to FIG. 12. FIG. 12 is a schematic diagram of an operation phase sequence according to another embodiment of the present invention. The first operation phase sequence PS1 is [PH1 PH2 PH1 PH2 PH3 PH4]. Compared with FIG. 1, the first operation phase sequence PS1 adds an operation set having the first operation phase PH1 and the second operation phase PH2 for each operation phase sequence. The second operation phase sequence PS2 is [PH5 PH6]. As shown in FIG. 12, during duty cycles T1 and T2, three fourths of duration is utilized for generating the positive charge pump voltage AVDD, and the remaining one fourth of duration is utilized for generating the negative charge pump voltage VCL. The charge distribution proportion of the first flying capacitor $CF_1$ is 2:1. Overall, the charge pump circuit 40 generates the positive charge pump voltage AVDD with higher efficiency and the negative charge pump voltage VCL with lower efficiency.

In view of flying capacitor, the charge pump circuit 40 utilizes 1.66 flying capacitors for producing the positive charge pump voltage AVDD and 0.33 flying capacitors for producing the negative charge pump voltage VCL. As a result, the present invention can adjust the efficiency of generating the positive charge pump voltage AVDD and the negative charge pump voltage VCL by charge proportion distribution. Please note that the above-mentioned embodiments are exemplary embodiments of the present invention, and those skilled in the art can make alternations and modifications accordingly.

In summary, compared with the prior art, the present invention requires fewer flying capacitors, reducing manufacturing cost. Furthermore, the present invention can dynamically arrange operation phase sequences to achieve high efficiency charge pumping by sharing part of the flying capacitors for pumping purposes.

Those skilled in the art will readily observe that numerous modifications and alterations of the device and method may be made while retaining the teachings of the invention.

What is claimed is:

1. A charge pump circuit for producing a positive charge pump voltage and a negative charge pump voltage according to an input voltage, the charge pump comprising:
   an input end for receiving the input voltage;
   a first reservoir capacitor comprising a first terminal and a second terminal, wherein the second terminal is coupled to a ground end;
   a second reservoir capacitor comprising a first terminal and a second terminal, wherein the second terminal is coupled to the ground end;
   a first output end coupled to the first terminal of the first reservoir capacitor for outputting the positive charge pump voltage;
   a second output end coupled to the first terminal of the second reservoir capacitor for outputting the negative charge pump voltage; and a charge pump unit coupled to the input end, the first terminal of the first reservoir capacitor, and the first terminal of the second reservoir capacitor, comprising:
a first flying capacitor;
a second flying capacitor;
a first switch coupled between the input end and a first terminal of the first flying capacitor;
a second switch coupled between the ground end and a second terminal of the first flying capacitor;
a third switch coupled between the input end and the second terminal of the first flying capacitor;
a fourth switch coupled between the first terminal of the first reservoir capacitor and the first terminal of the first flying capacitor;
a fifth switch coupled between the ground end and the first terminal of the first flying capacitor;
a sixth switch coupled between the first terminal of the second reservoir capacitor and the second terminal of the first flying capacitor;
a seventh switch coupled between the input end and a first terminal of the second flying capacitor;
an eighth switch coupled between the ground end and a second terminal of the second flying capacitor;
an ninth switch coupled between the input end and the second terminal of the second flying capacitor;
a tenth switch coupled between the first terminal of the first reservoir capacitor and the first terminal of the second flying capacitor; and
a control unit for controlling on/off operation of the first switch, the second switch, the third switch, the fourth switch, the fifth switch, the sixth switch, the seventh switch, the eighth switch, the ninth switch, and the tenth switch to produce the positive charge pump voltage and the positive charge pump voltage;
wherein the control unit controls the fifth switch, the sixth switch, the seventh switch and the eighth switch to be turned on and controls the first switch, the second switch, the third switch, the fourth switch, the ninth switch and the tenth switch to be turned off so that the charges stored on the first flying capacitor are transferred to the second reservoir capacitor, the negative charge pump voltage is outputted via the second output end and the input voltage charges the second flying capacitor.

2. The charge pump circuit of claim 1, wherein the control unit controls the first switch and the second switch to be turned on so that the input voltage charges the first flying capacitor.

3. The charge pump circuit of claim 2, wherein the first flying capacitor holds a voltage difference between the first terminal and the second terminal thereof identical to the input voltage after charging.

4. The charge pump circuit of claim 3, wherein the control unit controls the third switch and the fourth switch to be turned on so that the charges stored on the first flying capacitor are transferred to the first reservoir capacitor.

5. The charge pump circuit of claim 4, wherein the first reservoir capacitor holds a voltage difference between the first terminal and the second terminal thereof twice the input voltage after transferring.

6. The charge pump circuit of claim 1, wherein the second reservoir capacitor holds a voltage difference between the first terminal and the second terminal thereof identical to the positive input voltage after transferring.

7. The charge pump circuit of claim 1, wherein the second flying capacitor holds a voltage difference between the first terminal and the second terminal thereof identical to the input voltage after charging.

8. The charge pump circuit of claim 7, wherein the control unit controls the ninth switch and the tenth switch to be turned on for transferring the charges stored on the second flying capacitor to the first reservoir capacitor.

9. The charge pump circuit of claim 8, wherein the first reservoir capacitor holds a voltage difference between the first terminal and the second terminal thereof twice the input voltage after transferring.

* * * * *